April 11, 1961  I. T. SCHARFENBERGER  2,979,155
WORKMAN'S SUPPORTING DEVICE
Filed April 17, 1957  2 Sheets-Sheet 1
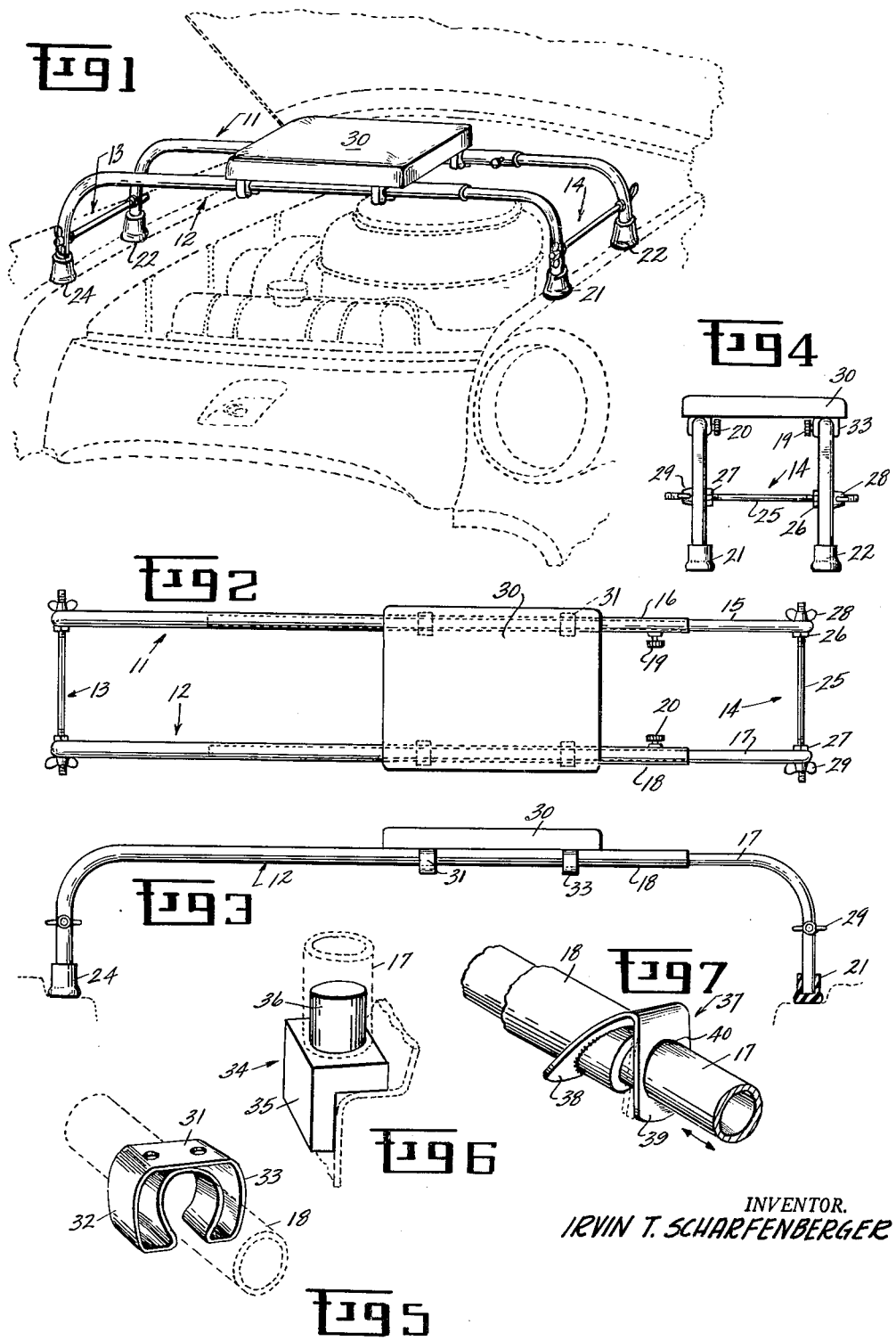
INVENTOR.
IRVIN T. SCHARFENBERGER

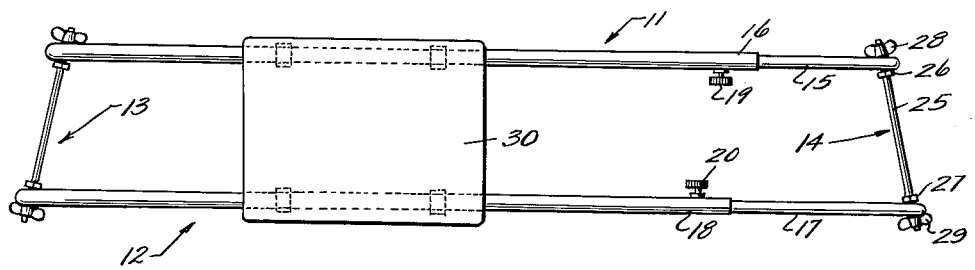
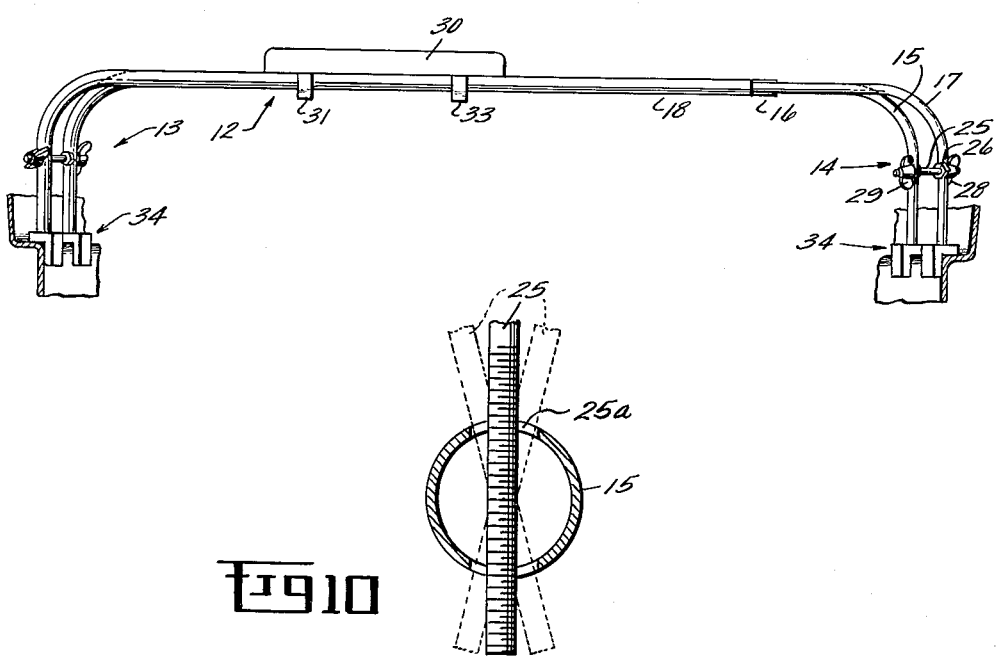

United States Patent Office 2,979,155
Patented Apr. 11, 1961

2,979,155
WORKMAN'S SUPPORTING DEVICE
Irvin T. Scharfenberger, 7267 Jethve Lane, Madeira, Cincinnati, Ohio
Filed Apr. 17, 1957, Ser. No. 653,371
1 Claim. (Cl. 182—222)

The present invention provides a means for supporting a workman in a comfortable position while leaving both hands and arms free to work in a confined space with limited headroom, such as the engine compartment of a modern automobile.

The engine compartment of a modern automobile or truck, of the type in which the hood is either removable or is hinged adjacent one edge so it can be raised, presents a confined space having limited head room. Such space is not readily accessible for convenient repair or adjustment of equipment therein and requires frequent shifting of position, from one side of the vehicle to the other, for a workman to reach the various portions thereof. In the usual case, access to the engine or other equipment mounted within the compartment, is gained from one side or the other by the workman leaning over a fender of the vehicle. From such position, only approximately half of the space within the compartment is within the workman's reach, so he must shift positions and lean in over the opposite fender to gain access to the remainder of the space within the compartment. It is possible in some instances, and for short periods of time, for a workman to lean into the compartment far enough that the weight of his legs is supported by the fender. However, in such case, the weight of his torso, is supported on his hand or elbow, thus leaving but one hand free to work.

Applicant's invention permits ready access to the engine and other equipment within the engine compartment of a truck or automobile without constant shifting of the workman's position from one side of the vehicle to the other, while leaving both hands and arms free to work. This is accomplished by provision of a frame which spans the engine compartment and is supported by the body or fenders of the vehicle. The frame carries a rest for supporting the weight of the workman, so that he is supported in close proximity to the equipment he desires to work on and for prolonged periods of time without discomfort.

An object of the present invention is to provide means for permitting ready access to the engine compartment of a modern automotive vehicle.

Another object is to provide means for supporting a workman in close proximity to an engine compartment while leaving both hands and arms unrestrained.

A further object is to provide a frame for supporting a workman above an engine compartment for prolonged periods of time while leaving both hands and arms unrestrained.

An additional object is to provide means for supporting a workman above an engine compartment in position to apply vertical pressure for prolonged periods of time.

Other objects and many of the attendant advantages of this invention will be readily appreciated as the same becomes better understood by reference to the following detailed description when considered in connection with the accompanying drawings wherein:

Fig. 1 is a perspective view of the present invention in working position on an automobile;

Fig. 2 is a plan view showing the construction of the side rails of the present invention;

Fig. 3 is an elevation view of the present invention;

Fig. 4 is an end view in elevation showing the details of the spaces;

Fig. 5 is a perspective view at an enlarged scale of the rest-retaining clip;

Fig. 6 is an enlarged view of an alternative friction element;

Fig. 7 is a fragmentary view of an alternate side rail clamp;

Fig. 8 is a plan view of the present invention in a readjusted position for the taper of the engine compartment;

Fig. 9 is an elevation view of the present invention in a readjusted position for the taper of the engine compartment; and Fig. 10 is an enlarged cross-sectional view of the aligned over-sized openings in the tubular member through which the spacer rod extends.

Referring more particularly to the drawing, the present invention, as illustrated in Fig. 1, consists of a rest carried by an axially adjustable supporting frame which extends between opposite fenders of a vehicle across the engine compartment. As shown in Fig. 2, the frame includes a pair of side rails 11 and 12 maintained in generally parallel, spaced relation by spacers 13 and 14. Each side rail is made up of two tubular members 15, 16, 17 and 18, one of which is telescoped within the other. This construction facilitates adjustment of the length of the side rails as desired, by extending or retracting the telescoped members. When the side rails have been adjusted to the proper length, members 15 and 17 are clamped within members 16 and 18 by tightetning thumb screws 19 and 20 respectively. Referring to Fig. 3, the free end of each tubular member is bent, or otherwise formed, at an angle to the remainder of the member to form a supporting leg at each end of each side rail. To provide a friction surface and to prevent marring of the finish of the vehicle, friction elements, such as crutch tips 21, 22, 23 and 24 are positioned on the extremities of the legs. As illustrated in Fig. 4, each of the spacers 13 and 14 includes a rod 25 having externally threaded extremities upon which are threaded locknuts 26 and 27. The ends of the rods are then passed through aligned openings 25a in adjacent legs and wingnuts 28 and 29 threaded thereon and tightened to clamp each leg between a wingnut and a locknut. Referring again to Figs. 1 and 2, a rest 30 is provided, consisting of a planar, rigid base member having a padded upper surface. The rest is removably mounted on the frame by means of spring clips 31 such as shown in Fig. 5. Such clips are secured to the lower surface of the base by means of screws, bolts, etc., and include convergent, resilient arms 32 and 33 which grip the side rails and retain the rest in position. The clips are sufficiently flexible to permit the rest to be slidably positioned on the frame or removed entirely by merely pulling upwardly to spread the arms 32 and 33 so as to release the side rails.

An alternate type of friction element 34 is shown in Fig. 6 for use in place of the crutch tips 21—24 of Figs. 1, 3 and 4. Member 34 consists of an angle section 35 covered with rubber, plastic or similar material, and adapted to bear against a step-like portion of the vehicle body or fender, and a post 36 adapted to be received within the open end of each leg.

Fig. 7 illustrates an alternative clamping means for locking the telescoped members of the side rails in position. Such means consists of a resilient clip 37 having two divergent portions 38 and 39, one of which is welded, brazed or otherwise secured to member 16 or 18, and the other of which is formed with an opening 40 slightly larger than the diameter of members 15 or 17 which is received therein. In its unflexed position, the sides of the opening 40 bind against the outer surface of member 15, locking it in position. When portion 38 is flexed toward portion 39, member 15 is released, allowing it to be retracted into or extended from member 16.

In the operation of the present invention, the side rails 11 and 12 are adjusted to the right length to adapt the frame to the particular make and model of vehicle. This may or may not require that one side rail be longer than the other, but provision is made for this adjustment by forming the diameter of the openings 25a in the legs slightly larger than that of the rods 25 to allow limited angular movement of the rods relative to the legs. After the frame is adjusted to the proper length, the telescoped members of the side rails are clamped together and the wingnuts on the spacers are tightened. The rest is then positioned on the frame and the frame is placed in position spanning the engine compartment, as shown in Fig. 1. With the frame in position above the radiator of the engine, the mechanic or workman can stand on the front bumper (not shown) of the vehicle and lean over the compartment with his chest against the rest. In such position, the mechanic's weight is supported by the frame without the necessity of his leaning on a hand or elbow, thus leaving both hands unrestrained for repairing or adjusting the engine or other equipment within the compartment. In some instances, such as when reboring a cylinder of the engine, it may be desirable for the mechanic to sit upon the rest with his feet within the compartment. In such position, the workman is able to apply a large vertical force directly below him, thus enabling such jobs to be performed faster and with greater ease and accuracy than formerly possible.

While particular embodiments of the invention have been illustrated and described, it will be obvious to those skilled in the art that various changes and modifications may be made without departing from the invention and it is intended to cover in the appended claim all such changes and modifications that come within the true spirit and scope of the invention.

What I claim as my invention is:

Means for supporting the body of a workman for unhampered access to the engine compartment of an automotive vehicle, comprising: a frame adapted to bridge said engine compartment, said frame including two elongated side rails made up of telescoping tubular members with transverse openings therethrough, means locking the telescoping members in adjustable relation, spacer rods passing through said openings, said rods being smaller in diameter than the openings in said side rails to permit limited angular movement of said rods relative to said side rails, means adjustably interconnecting said rails and said rods including nuts threaded on said rods engaging said rails therebetween whereby said rails are held in generally spaced parallel relation and are independently adjustable in an axial direction, a removable rest mounted on said side rails by means of four gripper clips that permit the rest to be mounted in any position along said side rails, and means mounted on ends of said side rails and adapted to bear against a supporting surface.

References Cited in the file of this patent

UNITED STATES PATENTS

| | | |
|---|---|---|
| 175,095 | Hoehn | Mar. 21, 1876 |
| 642,168 | Smith | Jan. 30, 1900 |
| 1,247,161 | Silverman | Nov. 20, 1917 |
| 1,681,192 | McBride | Aug. 21, 1928 |
| 1,693,166 | Walcom | Nov. 27, 1928 |
| 1,830,347 | Camden | Nov. 3, 1931 |
| 1,976,031 | Lowenberg | Oct. 9, 1934 |
| 2,230,511 | Suttrup | Feb. 4, 1941 |
| 2,569,729 | Nold | Oct. 2, 1951 |
| 2,671,355 | Hawkins | Mar. 9, 1954 |

FOREIGN PATENTS

| | | |
|---|---|---|
| 694,008 | Germany | July 23, 1940 |